United States Patent [19]

Takeuchi et al.

[11] Patent Number: 5,512,361

[45] Date of Patent: Apr. 30, 1996

[54] INTEGRALLY MOLDED POLYURETHANE FOAM PRODUCTS

[75] Inventors: Nobuo Takeuchi; Taishi Kitano; Fumio Mizuno; Hiyoshi Ishikawa; Sotaro Yoshimura; Tomonari Yamaguchi, all of Aichi, Japan

[73] Assignee: Inoac Corporation, Nagoya, Japan

[21] Appl. No.: 382,266

[22] Filed: Feb. 1, 1995

[30] Foreign Application Priority Data

Feb. 3, 1994 [JP] Japan ................................. 6-032852
Feb. 18, 1994 [JP] Japan ................................. 6-045249
Jun. 8, 1994 [JP] Japan ................................. 6-151513

[51] Int. Cl.$^6$ .................................................. B32B 27/00
[52] U.S. Cl. ........................................ 428/319.3; 428/318.8
[58] Field of Search ............................. 428/318.8, 319.3

[56] References Cited

U.S. PATENT DOCUMENTS

4,891,081  1/1990  Takahashi et al. ................... 428/319.3
5,194,325  3/1993  Jones ...................................... 428/318.8

*Primary Examiner*—Melvyn I. Marquis
*Attorney, Agent, or Firm*—Finnegan, Henderson, Farabow, Garrett & Dunner

[57] ABSTRACT

Integrally molded polyurethane foam products that are free of bubbles formed from the gas evolved during foaming of foaming materials, that do not allow the foaming materials to exudate and that have surfaces with adequate gas permeability and soft to the touch, giving sufficient satisfaction at use, being free of stuffy and other unpleasant feelings to the touch. The present invention also relates to an integrally molded polyurethane foam product comprising a skin member that is formed into a desired form by sewing and a polyurethane foam that is made by foaming a foaming material being poured into said skin member, in which the skin member is made by laminating a fabric and a synthetic resin film and is provided with 5 to 100 through holes per $cm^2$ in a diameter of 0.01 to 0.3 mm. The foaming pressure of the polyurethane material used in the production of these integrally molded polyurethane foam products is preferably 0.5 to 2.0 $kg/cm^2$.

10 Claims, 6 Drawing Sheets

INTEGRALLY MOLDED POLYURETHANE FOAM PRODUCTS

BACKGROUND OF THE INVENTION

1. Field of the Invention

The present invention relates to integrally molded polyurethane foam products (designated hereafter as integrally molded urethane products) that are obtained by integrally molding skin materials and polyurethane foam materials (designated hereafter as foam materials) and to the method of producing the products. The integrally molded urethane products of the present invention are used for manufacturing head-rest, arm-rest, center arm-rest and other cushion products for car.

2. Prior Art

Figure 5:
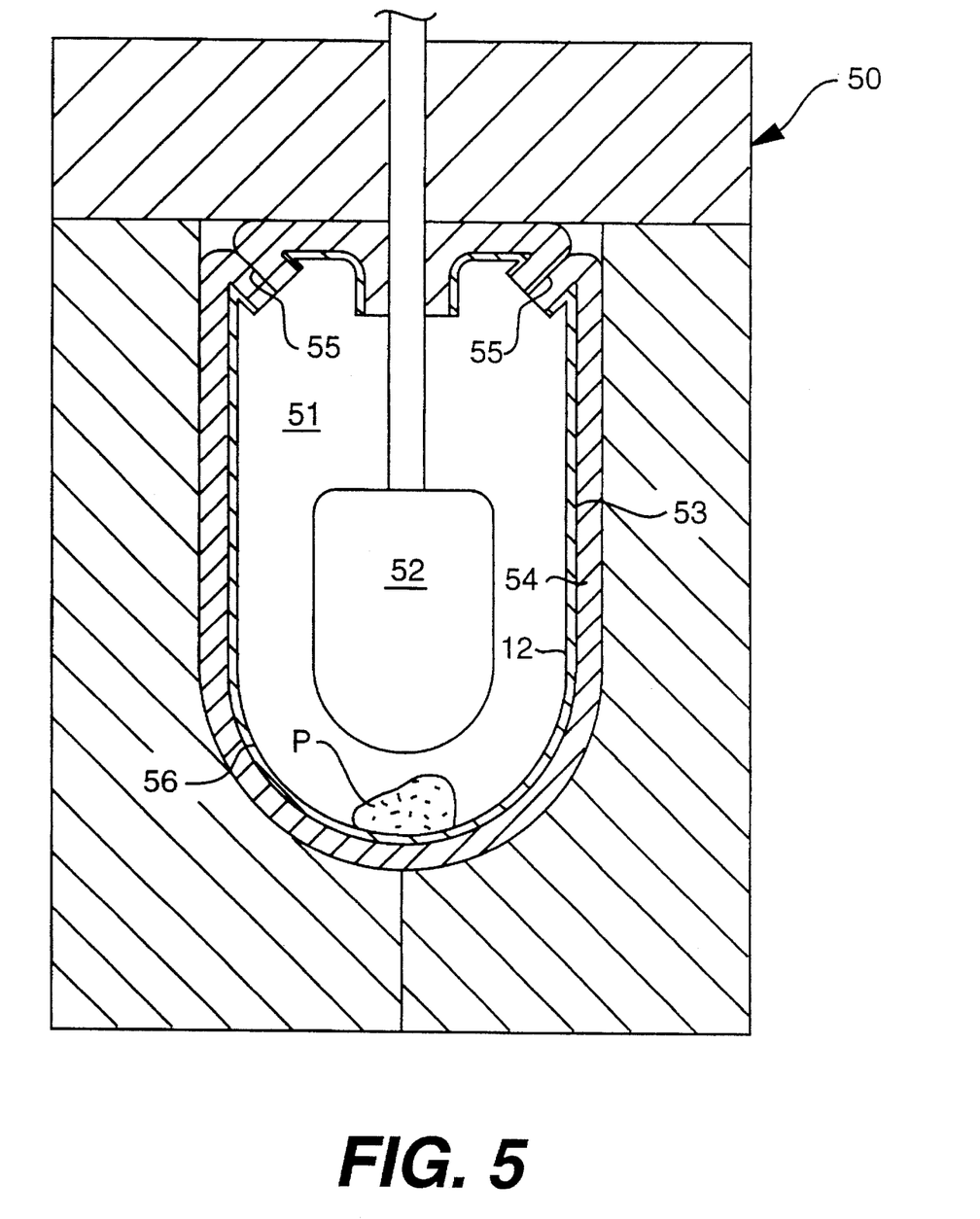
FIG. 5 is a section diagram showing the production process of ordinary foam molded products.

Conventionally such head-rest and other cushion products for car have been manufactured by integrally foaming or pouring in place (hereinafter described as "foam in place") in which a foaming material such as reactive foam ingredients of polyurethane foam is deposited on or into a skin member to be covered and the foaming reaction takes place in it. However, for the skin member for a covering using a fabric with high permeability of gases or liquid, such a two (2) or three layered skin member has hitherto been employed. The former is a laminated fabric made by laminating a fabric and a synthetic resin film (designated sometimes hereafter simply as film), that has virtually no gas premeability and the latter is another laminated one made by sandwiching a polyurethane slab-foam layer between the laminated fabric. An example of a method for producing a heat-rest using such a two(2) layered, laminated fabric is shown in FIG. 5, in which the numeral 50 stands for a foaming mold comprising several mold parts, 51 for product cavity, 52 for an insert and P for a liquid foaming material of polyurethane, and in the cavity 51 is placed a covering 53 that has been formed into a desired shape by cutting and sewing skin members. The numeral 55 stands for the seams.

From these description it is clear that the 2 previous skin members have the following problems.

(i) As the above film, polyurethane film, polyvinyl chloride film and other films have been used conveniently, but the surface of these films have so low sliding properties because of its sticky characteristic that the sewing movement of a sewing machine is not smooth causing insufficient sewing performance. To make sewing smoother silicone oil has usually been applied over the film surface, but due to the high releasing action of silicone oil the skin member and polyurethane foam (sometimes designated hereafter simply as foam) tend to separate readily.

(ii) When gas evolves in the course of foaming of a foaming material, it remains as bubbles between the film and the foam because there is no exit for gas.

(iii) Due to no gas permeability of the film, the foaming pressure of the foaming material concentrates to seams of the skin member resulting in exudation and stain of the foaming material therefrom. Accordingly an operation to remove the exuded foam is required after removing the product from the die.

(iv) Due to no gas permeability around surface of the molded product, it gives stuffy and other unpleasant feelings to touch.

(v) Because a film with relatively high rigidity is joined over the surface of a foam, flexibility of the surface of a molded product is impaired giving a rigid touch unless a polyurethane slab-foam layer is specially provided.

Figure 6:
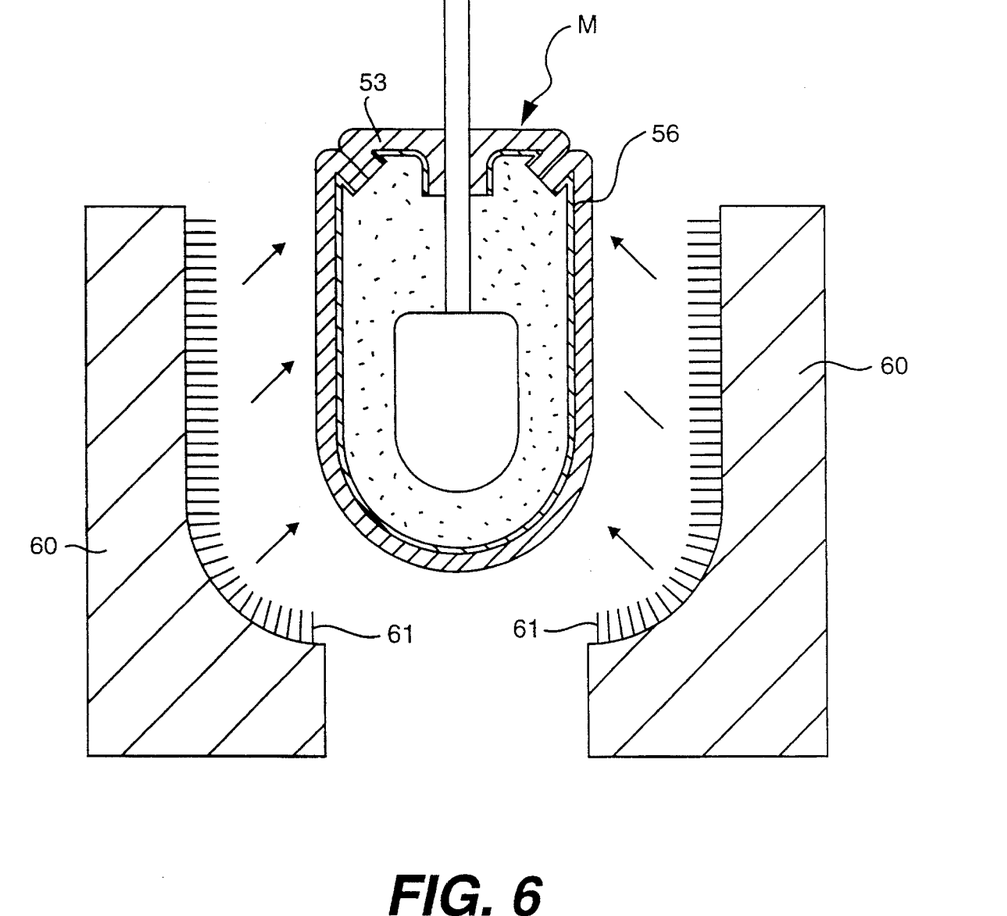
FIG. 6 is a section diagram showing an example of the method providing skin of the foam molded products with gas permeability.

(vi) For increasing gas permeability and flexibility around surface of the foam, which is in contact with the skin member, such an after-treatment as roll crushing or piercing crushing is required after removing molded product. For example, a method of such an after-treatment is shown in FIG. 6. Thus, the sign M in FIG. 6 stands for a molded product and 60 for a piercing apparatus. The inner surface of the latter is made to fit the outer form of the molded product M, and is provided with numerous needles 61 that can reach the plastic film 56 so that the film is pressed from outside through the molded product M. In addition to this procedure, compressing the pierced molded product M with a roller, or the so-called process of crushing, may be sometimes employed in combination.

In this way an additional process is required causing rise in equipment cost and man-hour. For the so-called doughnut-form head-rest that is molded into a round form (or doughnut form), even the above piercing apparatus 60 cannot make holes to the film in the skin member that constitutes the inner surface of the doughnut ring. Subsequently gas permeability in these parts becomes poor causing stuffy touch when the head rest is used.

SUMMARY OF THE INVENTION

Object of the Invention

The object of the present invention is to solve the above problems and to provide an integrally molded urethane product that is free of bubbles by making gas evolving during foaming of foaming material readily escape out-side, and that allows no exudation of foaming material, gives a proper gas permeability in the surface thus retaining a flexible touch, and gives an excellent feeling at use being free of stuffy touch.

The inventors of the present invention have studied extensively on the skin members to be used in an integrally molded urethane product to find that the defects of previous products that use skin members, in which film is laminated, can he eliminated by employing a skin member in which at least a fabric and a synthetic resin film are laminated and a proper number of through holes (designated sometimes hereafter simply as holes) with a proper diameter at proper parts are provided, or by employing such a skin member with specific gas permeability, which is consisted only of a fabric with a backcoating, and have completed the present invention.

Characteristics of the Invention

The present invention is an integrally molded polyurethane foam product that comprises a skin member and a polyurethane foam, and the skin member is made by laminating at least a fabric and a synthetic resin film and contains 5 to 100 (per $cm^2$) through holes in a diameter of 0.01 to 0.3 mm at proper parts.

The second invention comprises using polyurethane or polyvinyl chloride for the above synthetic resin and the above film is 30 to 100 μm thick and the above holes have a diameter of 0.05 to 0.2 mm and their number is 10 to 50 per $cm^2$.

The third invention comprises a product in which the skin member is provided with through holes in a diameter of 0.01 to 0.3 mm in a number of 5 to 100 per $cm^2$ during cutting the member to a desired shape and then is sewn into a desired covering.

The fourth invention comprises a product in which the polyurethane foam is produced at a foaming pressure of 0.5 to 2.0 $kg/cm^2$.

As mentioned above, head-rest, arm-rest and other cushion products for car have been manufactured by foaming in place in which a foaming material is deposited into a covering consisted of skin members and the foaming reaction takes place in it, and when a fabric with particularly high permeability ability is employed for the skin member it is used a laminated fabric with a synthetic resin film as an essential component. Because such a film hardly shows a sufficient gas permeability, the gas evolving from the foaming material cannot escape outside through the skin member causing concentration of foaming pressure at seams of the covering. However, in the skin member used in the present invention, a proper number of through holes in a proper diameter is provided at proper parts of the skin member including the essential material of the film, so that whole of the skin member keeps a proper gas permeability allowing no concentration of gas pressure at particular parts. As the result such profitable effects as good degassing and no bubble formation are obtained.

Generally flexible polyurethane foams that are employed for the integrally molded urethane products as in the present invention contain high rates of independent closed cells, and so for securing an adequate gas permeability around the surface and flexibility, the closed cells are required to be broken by roll crushing or other techniques after removing products from a mold to convert them to interconnecting open cells. In the present invention, however, the synthetic resin film is provided with adequate through holes so that the above after-treatment is not required for securing a sufficient gas permeability around the surface and flexible touch of the products. By using such a special skin member the present invention provides an integrally molded urethane product with soft and non-stuffy touch and in desired forms, by general foaming process of a foaming material without particular aftertreatments.

In the integrally molded urethane products in the inventions Nos. 1 and 3, the skin member has excellent gas permeability and so the gas evolving during foaming of a foaming material does not stay between the skin member and foam resulting in no formation of bubbles in the final products. In sewing the skin member into a covering of final products, numerous through holes provided over the film make the movement of sewing machine smooth, thus allowing stable sewing operation in higher speed; these contribute to improving the productivity. In addition, the adhesion between the backing film applied over the surface of the skin member and foam becomes better, and there is no such an inconvenience as peeling off of the skin member from foam due to silicone oil applied over the film surface hitherto practiced in prior art.

In the second invention, providing a film made of a particular synthetic resin in a particular thickness with through holes in a preferable diameter and a number makes the effects of the first invention more excellent. In the fourth invention, the kind of synthetic resin and thickness of the film employed are defined and the foaming pressure is limited within a preferable range for the third invention, and products with more satisfactory form and properties are obtained.

It is also noted that the integrally molded urethane products of the present invention have low initial rigidity giving soft touch, and men feel nice touch when they contact their head or arm to them. Such after-treatments as roll crushing and piercing crushing are not necessary, and because through holes are provided at the same time of cutting skin members into a desired shape the process is preferable from the point of economical view.

An integrally molded polyurethane foam product in the fifth invention comprises a skin member that is sewn into a desired covering and polyurethane foam that is made by foaming in place. The skin member is made by laminating at least a fabric and a synthetic resin film, and over the surface of the synthetic resin film, which adheres to the foam, it exhibits fine unevenness, and numerous holes in a diameter of 0.1 to 0.3 mm are provided in parts or whole of the caves in the uneven surface.

In an integrally molded polyurethane foam product in the sixth invention the caves in the above skin member have a diameter of 0.4 to 0.6 mm and are distributed in 50 to 150 per $cm^2$.

In an integrally molded polyurethane foam product in the seventh invention, the skin member that has been formed into a desired shape by cutting and sewing as described above contains the above synthetic resin film which is provided with numerous caves and through holes in a diameter of 0.1 to 0.3 mm, which are made by using a heated embossing roll that bears numerous projections over its outer surface.

In the integrally molded products of the present invention fine uneven surface is provided over the backing film of the plastic film giving good sliding during cutting and sewing in the covering production and resulting in easier operations. In addition, because the backing film of the above plastic film is provided with numerous holes that do not allow permeation of liquids but do only gases, good gas permeability can be secured.

In the integrally molded products of the present invention foaming materials do not exudate from the skin member during foaming, and thus no skin spoiling and underfill take place. In addition, because excess foaming gas can escape outside of the skin through numerous holes provided in the backing film of the plastic film, such after-treatments as piercing and crushing in the film after foaming are not required, thus allowing extremely economical production of the products.

In the integrally molded products of the present invention elastic deformation in the internal foam is free of hindrance and so they are extremely useful particularly for such appliances as head-rest or seat cushion for car, in which elastic deformation of foam mitigates impact and absorbs vibration. The products have excellent gas permeability also and prevent stuffy touch from occurrence.

An integrally molded polyurethane foam product in the eighth invention comprises a skin member and a polyurethane foam, and the skin member is composed of a fabric with a backcoating that is applied over a surface of the fabric, and its gas permeability is 0.01 to 1.0 $cm^3/cm^2/sec$. The above backcoating and the above polyurethane foam are joined together directly.

An integrally molded polyurethane foam product in the ninth invention is produced with a foaming pressure of the above polyurethane foaming material of 0.5 to 2.0 $kg/cm^2$.

An integrally molded polyurethane foam product in the tenth invention is produced with a foaming pressure (P $kg/cm^2$) of the above polyurethane foaming material within the range shown by the following equation; where represents the above gas permeability in $cm^3/cm^2/sec$.

$$(G+0.98)\times 50/99 \leq (G+2.96)\times 50/99$$

As mentioned above, in a conventional product the backing film is used apparently for the sake of keeping strength of the surface layer of the products, but because it hardly has a sufficient gas permeability the gas evolving from foaming material cannot escape through the skin member with the result of concentration of gas pressure at seams of the covering. However, the skin member used in the present invention is composed only of a fabric with a backcoating, without laminated resin film, and so the covering retains over whole surface a sufficient gas permeability causing no concentration of foaming pressure at particular parts. Subsequently good gas escaping, no bubble formation and other favorable effects may be obtained.

In such a flexible mold polyurethane foam employed as in the present invention, it usually contains independent closed cells, and for providing the foam surface with adequate gas permeability and soft touch, such an after-treatment as crushing is usually required after breaking mold to break cells and to convert them into connecting open cells. In the products of the present invention, however, due to the absence of resin film the parts around the surface can hold a sufficient gas permeability and soft touch without application of such after-treatments as described above. In this way by using special skin member, the present invent ion offers an integrally molded urethane products in desired shape with soft touch and with no stuffy feeling, which is obtained by general foaming and other processes with no need of particular after-treatments.

In the integrally molded urethane products in the eighth through tenth inventions, the skin members have so excellent gas permeability that the gas evolving during foam curing of a foaming material does not stay between the skin member and foam, and subsequently the final products do not include bubbles. In addition, in sewing the skin member into a desired covering of molded product, sewing machine works efficiently due to good sliding property of the member making sewing operation stable and speedy with the result of higher productivity. The adhesion of the backcoating on the back side of the skin member and from foam satisfactory, and peeling off of the skin member from foam due to the action of silicone oil applied over the film surface as in prior art never takes place.

In the ninth and tenth inventions, in which such foaming materials as having foaming pressure that meets the gas permeability of skin member are employed, it has now been made possible to obtain readily molded products with excellent size accuracy by preventing exudation of foaming material and underfill from taking place. In the tenth invention the gas permeability and foaming pressure are further limited within a preferable range to obtain products with more excellent forms and properties.

The integrally molded urethane products in the present invention have so low initial rigidity and soft touch that they give nice feeling to touch when men contact them with head or arms. Production of the products of the present invention does not require such after-treatments as piercing crushing and roll crushing, and the laminating process is also not required because of no use of film in the skin member, and so in consideration of omitting the costs of film, slab foam and related members the production is highly economical.

DETAILED DESCRIPTION OF THE INVENTION

In the above description of the invention, a "skin member" is composed at least of a "fabric" that is backed with a backcoating and a "synthetic resin film" that is joined over a surf ace of the above fabric. As a fabric, woven cloth, knit-cloth, moquette, double raschel and others may be used. Preferable backcoating includes acrylic polyester and a mixture of acrylic polyester and butadiene rubber.

The raw materials for the synthetic resin film include polyurethane, polyvinyl chloride, polyethylene and a copolymer of ethylene-vinyl chloride. There is a close relationship among the kind of synthetic resin employed, the diameter (designated hereafter as hole diameter) of the through holes (that pierce through whole thickness of the skin member, but because fabrics have naturally sufficient gas permeability the actual significance of the diameter and number of holes depend on the requirement by the film) provided in the film, number of the holes per $cm^2$ and thickness of the film, and these parameters may be adequately selected for obtaining the-most preferable skin member.

The hole diameter is in the range of 0.01 to 0.3 mm and number of holes in the range of 5 to 100 per $cm^2$, and when as in the second invention in which the synthetic resin is polyurethane or polyvinyl chloride, the film thickness is 30 to 100 μm, hole diameter 0.05 to 0.2 mm and hole number 10 to 50 per $cm^2$, gas escapes outside smoothly during foaming whereas the foaming material does not exudate. The surface of the integrally molded urethane products thus manufactured has good gas permeability giving head-rest and other cushion products soft touch and excellent feeling at use.

When hole diameter is less than 0.01 mm and/or hole number is less than 5 per $cm^2$, gas escaping is not sufficient causing bubble formation between the skin member and foam, or foaming pressure concentrates at seams on the covering causing exudation of the foaming material. On the other hand, when hole diameter is more than 0.3 mm and/or hole number is more than 100 per $cm^2$, gas escapes very easily but together with escaping gas the foaming material will also exudate easily not only from seams but also from other parts of the covering.

The method of manufacturing integrally molded urethane products in the third invention comprises providing desired parts of skin member in desired shape with 5 to 100 through holes per $cm^2$, in diameter of 0.01 to 0.3 mm, during cutting the skin member made by lamination of at least a fabric and a synthetic resin film into desired shapes by using a die over whose inner surface are fixed 5 to 100 needles in diameter of 0.1 to 1.0 mm per $cm^2$, sewing the skin member in a desired shape into a definite form so as to make a covering with the fabric on outer surface, placing the covering into a mold and depositing or pouring a foaming material into the covering and removing the molded product from the mold after completion of foaming reaction. Polyurethane or polyvinyl chloride may be employed as the above synthetic resin. It may also be possible to make the above film 30 to 100 μm thick, hole diameter 0.05 to 0.2 mm, hole number 10 to 50 per cm², and the blowing pressure of the above foam 0.5 to 2.0 kg/cm².

The diameter of the above "needles" is determined properly depending on the desired diameter of through holes that are provided in the skin member, particularly synthetic resin film, and the kind of the synthetic resin and the thickness of the film made therefrom. The film made from the synthetic resins of polyurethane, polyvinyl chloride and others have some rubber elasticity and so the hole diameter is smaller than the diameter of the needles in specified rates. For example, for a polyurethane film 30 μm thick, use of needles in a diameter of 0.1 mm gives 0.01 mm of hole diameter; 0.8 mm of needle diameter gives 0.1 mm of hole diameter and 1.0 mm needles give 0.3 mm holes.

As the "foaming material" those members usually used for the production of flexible mold polyurethane foam may be employed without particular limitation. As the polyol component may be used such a mixture made by adding to polyether or a polymer-polyol blended member containing primary hydroxyl group and having molecular weight of 4000 to 8000 an amine type/tin type mixed catalyzer, low activity silicone-type foam stabilizer and water; as the isocyanate component may be used TDI, TDI/MDI, MDI or others.

The "foaming pressure" of a foaming material may not be limited particularly, but for the integral molding of the skin members with the special composition as described above, a foaming material with foaming pressure in the range of "0.5 to 2.0 kg/cm²" may preferably used. When the foaming pressure is within this range, synthetic resin films with hole diameter and hole number close to the lower limits of proper ranges will show satisfactory gas escaping and will not form bubbles or underfill. Even when the values of hole diameter and hole number are close to the upper limits, there will not occur exudation of the foaming material accompanying escaping gas from seams of the skin member.

In the above invention the surface of the above rigid resin film is a finely uneven (or embossed) surface and is provided with numerous holes.

The above uneven surface is for the sake of making sticky characteristic of the film surface smaller. By making the surface uneven the sticky characteristic between the film surface and the sewing machine can be made smaller, improving sliding during cutting and sewing with a sewing machine, and these effects contribute to more efficient production of covering by cutting and sewing operations. The number of caves in the above uneven surface may be determined properly depending on the thickness and characteristic of the backing layer and other factors, but it is preferable to provide at least more than about 50 and less than 150 per cm². The diameter of the caves is preferably about 0.4 to 0.6.

The above-through holes are provided for the sake of providing the skin member for foam molding with gas permeability while keeping non-permeability to liquids. The holes have a diameter of 0.1 to 0.3 mm. When the diameter is less than 0.1 mm the skin member cannot have sufficient gas permeability while when it is more than 0.3 mm the member cannot keep sufficient non-permeability to liquids, particularly to urethane ingredients and other liquid foaming materials. The number of holes is preferable to be 20 to 70 per cm² in view of keeping sufficient gas permeability and improving elastic deformation and reversion to original forms of the foam molded products.

In the above invention a "skin member" is composed of a "fabric" with a "backcoating" that is applied for backing over a surface of the fabric. As the fabric similar members as described above may be given as examples. As the backcoating, acrylic polyester or a mixture of acrylic polyester and butadiene rubber is preferable, but any member that keeps hairs of cloth fixed so as to prevent them from falling off and to keep them in proper angle may be used, and therefore it is not necessarily limited to the above mentioned. The backcoating is applied over a surface of the fabric for backing to keep the "gas permeability" in the range of "0.01 to 1.0 cm³/cm²/sec."

When the gas permeability of the above backcoating is less than 0.01 cm³/cm²/sec, gas will difficultly escape outside and bubbles tend to occur between the backcoating and foam, or foaming pressure will concentrate at seams of the skin member causing exudation of the foaming material. By contrast when the gas permeability exceeds 1.0 cm³/cm²/sec gas will very readily escape outside and foaming material will exudate readily not only from seams but also from other parts of skin member.

As "foaming material" those that are used usually for the production of flexible mold polyurethane foams may be employed without limitation. As the polyol component may be used such mixtures made by adding to polyether or polymer-polyol blended members containing primary hydroxyl groups and having molecular weight of 4000 to 6000 an amine-type/tin-type mixed catalyzer, low activity silicone-type foam stabilizer and water; as the isocyanate component may be used TDI, TDI/MDI, MDI or others.

The "foaming pressure" of the foaming material is not particularly limited, but in case of the integral molding by using a skin member having the above-described specific gas permeability, it is preferable to employ a foaming material having a foaming pressure in the range of "0.5 to 2.0 kg/cm²" as in the third invention. When the foaming pressure is within this range gas will escape outside well and bubbles and underfill will not be formed even if the gas permeability is close to the lower limit value. On the other hand, when the gas permeability is close to the upper limit there will not occur exudation of the foaming material accompanying gas escaping from seams of the skin members.

Figure 7:
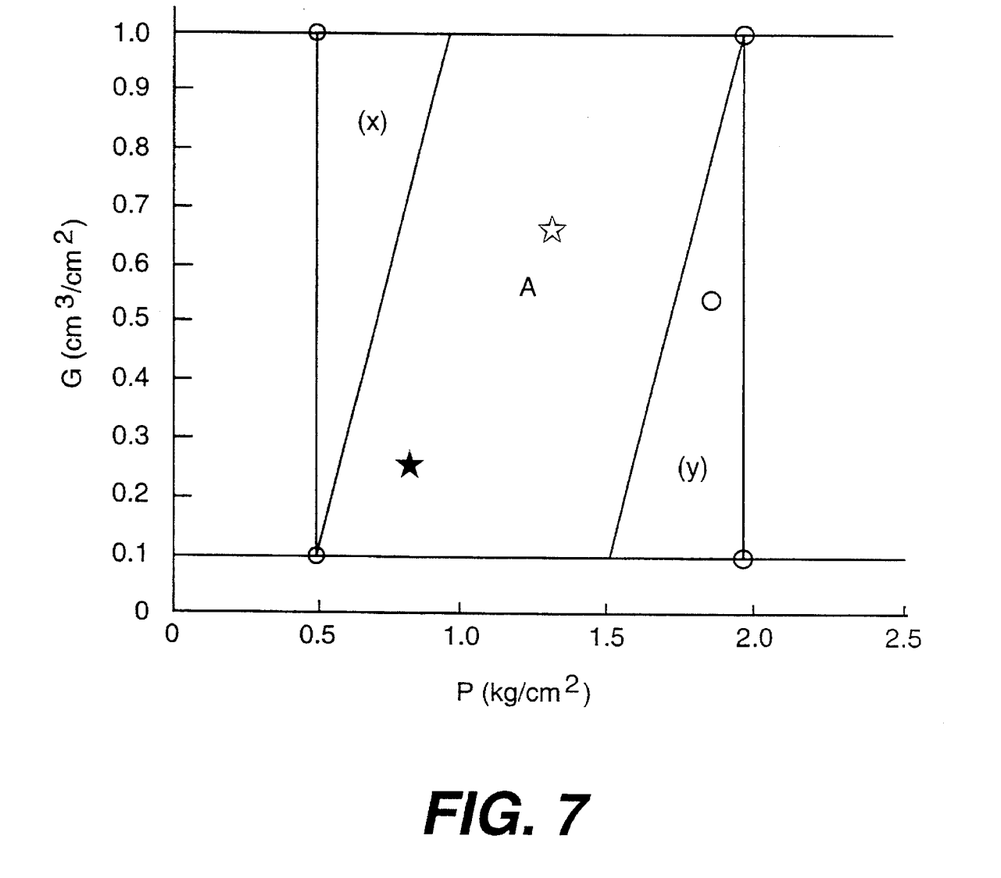
FIG. 7 is a diagram explaining the ranges most adequate for the gas permeability of skin member and foaming pressure of foaming material.

The foaming pressure (P) of a foaming material and the gas permeability (G) of a skin member are more preferable, as in the fourth invention, when they follow the following equation:

$$(G+0.98) \times 50/99 \leq P \leq (G+2.96) \times 50/99$$

and fall in the specific range (shown by A in FIG. 7) shown in FIG. 7. When the gas permeability of the skin member is within the above defined range and the foaming pressure within the above defined range, and further the gas permeability and foaming pressure are within the specific range that satisfies the above equation, there will be no problem in gas escaping and also in exudation of the foaming material even though either of the gas permeability or the foaming pressure is close to the upper or lower limiting value, and an integrally molded urethane product with excellent performance in a desired form may be obtained.

When the foaming pressure is within the above defined range but less than the lower limiting value of the above equation (the range shown in FIG. 7 with (x)), a molded product with high dimensional accuracy for a desired form may not he obtained in some cases. On the other hand, when the foaming pressure exceeds the upper limiting value of the above equation (the range shown in FIG. 7 with (y)), some amounts of foaming material may exudate from seams of the skin member.

EXAMPLES

Followings are examples for explaining concretely the present invention.

Example 1

A skin member was composed of the 3 layers of moquette that was backed with a coating of acrylic polyester, urethane slab-foam and a polyurethane film (30 μm thick). It was cut into a desired shape by using a Thomson die mounted onto the lower die of a press (over whose whole surface are fixed needles in a diameter of 0.8 mm uniformly in a number of 20 per $cm^2$) providing at the same time the above film with through holes, 0.1 mm in diameter, in a number of 20 per $cm^2$, and then sewn into the covering of a head-rest for car. Then this covering is placed into a foaming mold and a foaming material is poured in it, and after foaming the molded product was removed from the mold. The foaming pressure was 1.5 $kg/cm^2$.

And besides, these holes can be penetrated from the surface (the decorated layer side) of the skin member to the backside of it, and these holes can he made by penetrating from the reverse direction to the above, too. Particularly, in the case of the former, when a foaming material is foamed, ends of tears which were made by opening these holes work to stop up these holes. Therefore, this case is better than the latter case, because exudation of the foaming material is possible to be prevented certainly. This case also apply to the following Examples 2 and 3.

Example 2

A skin member was as in made in the composition similar Example 1 except excluding urethane slab-foam, and it was cut into a desired shape by using a Thomson die over whose surface were fixed uniformly needles 0.5 mm in diameter in a number of 20 per $cm^2$, providing the film with through holes 0.05 mm in diameter in a number of 20 per $cm^2$. It was then processed to produce a head-rest in a manner described in Example 1 by using a foaming material at a foaming pressure of 1.5 $kg/cm^2$.

As the foaming material, a mixture of TDI/MDI and a polyol components was used, the polyol components comprising polyether with an average molecular weight of 5000 and hydroxyl value of 30, polymer-polyol, a mixed catalyzer of amine type/tin type and in addition a low activity silicone and water.

In both of Examples 1 and 2, the gas evolving from the foaming material during foaming escaped successively outside through skin member that had a sufficient gas permeability, but the foaming material with some viscosity did not exudate at all.

The head-rest removed from a mold did not show any bubbles nor underfill, and without such after-processings as roll crushing and piercing crushing its surface part was soft having an adequate gas permeability and showed a very good touch to human skin.

The present invention is never limited by the above concrete Examples, but can be made into many Examples by changing conditions within the ranges specified by the present invention depending on the object and use thereof. For example, it may he used for the production of office chairs and seat for tractor or bus with relatively simple forms or molded products of front and rear seats in car.

Example 3

Figure 1:
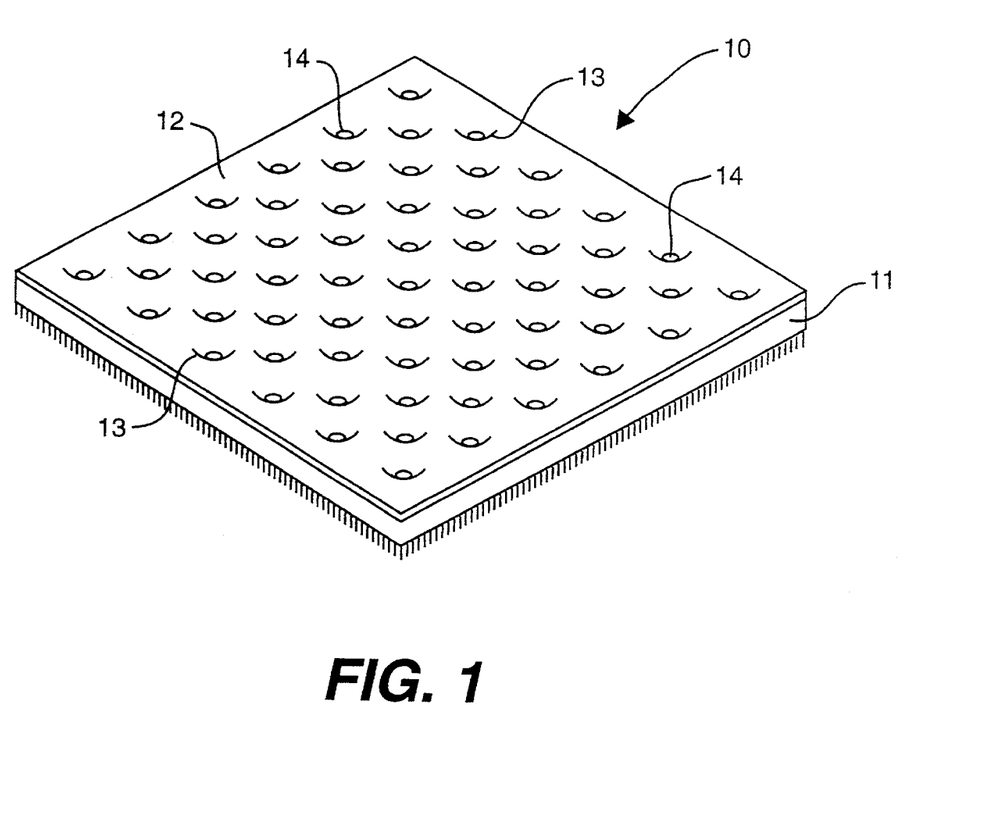
FIG. 1 is diagonal view from the back side of an example of skin member for foam molding in the present invention.
Figure 2:
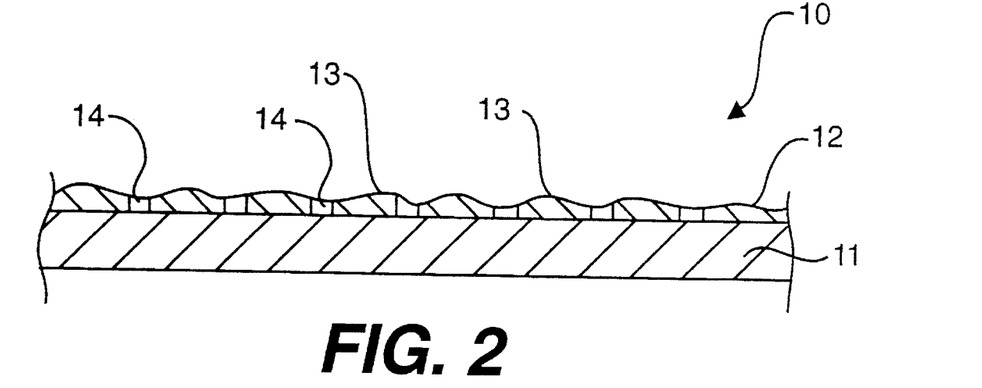
FIG. 2 is the section view of the above.
Figure 3:
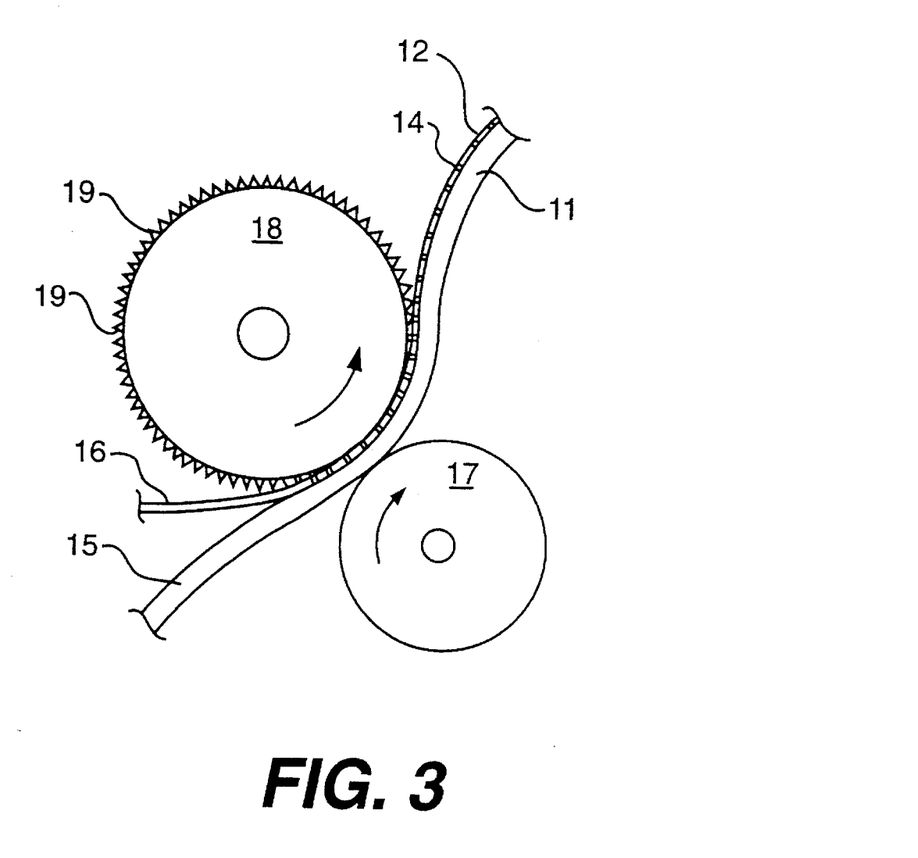
FIG. 3 is an outline scheme showing an example of the production of the skin member for foam molding, which is shown in FIG. 1.
Figure 4:
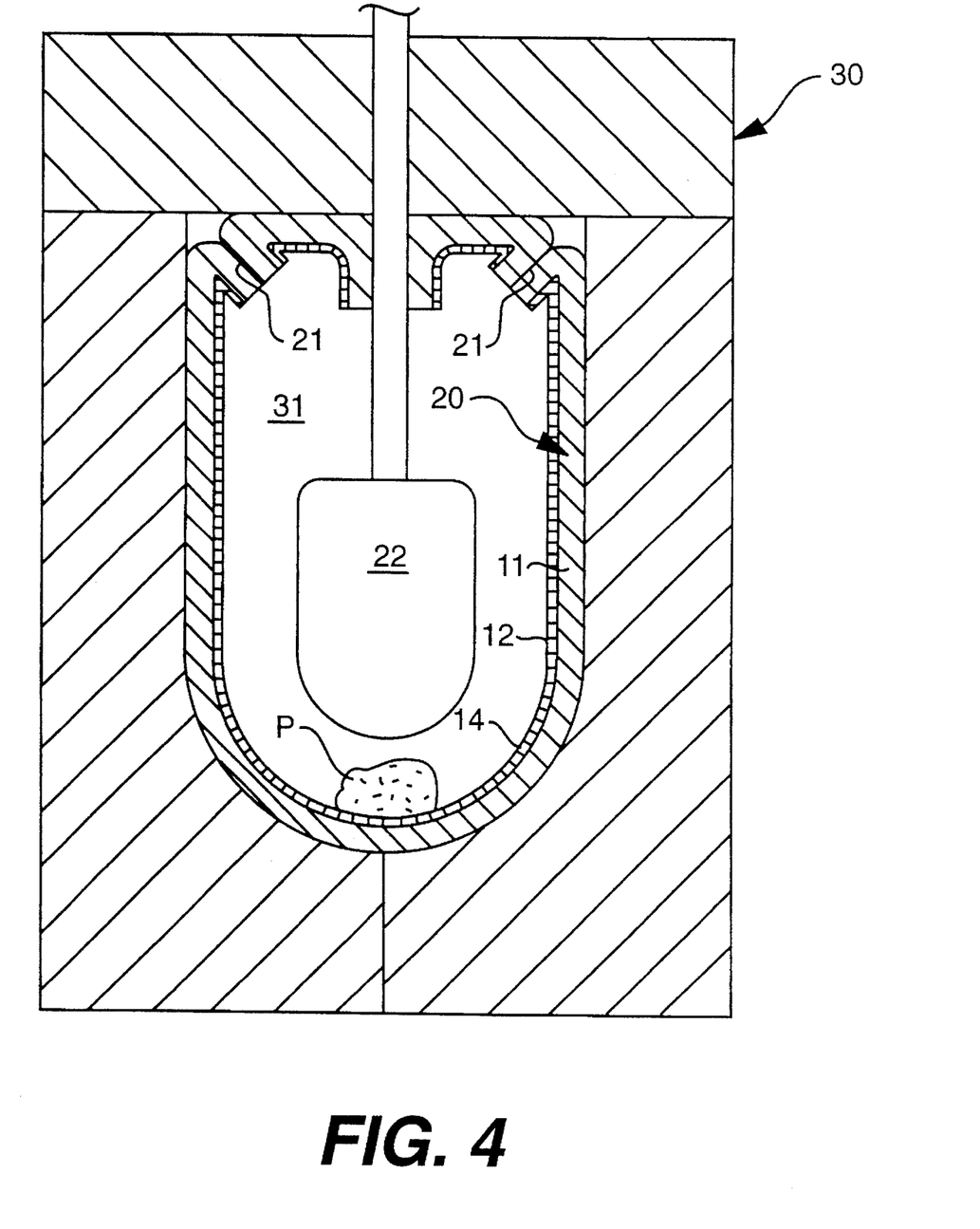
FIG. 4 is a section diagram showing an example of the production process of the foam molded products in the present invention.

FIG. 1 is a diagonal view from the back side of an example of a skin member for foam molding of the present invention, FIG. 2 its sectional view, FIG. 3 an outline scheme showing an example of manufacturing a skin member for foam molding, which is shown in FIG. 1, and FIG. 4 a sectional view showing an example of the method of manufacturing the foamed products in the present invention.

As shown in FIGS. 1 and 2, the skin member 10 for foam molding in the present invention is composed of a flesh side layer 11 made of gas-permeable material and a backing layer 12 made of a plastic film.

The flesh side layer 11 is made of a fabric or other woven materials or knit materials with sufficient gas permeability. These gas-permeable materials may he any of those exhibiting constantly gas permeability through texture or stitch. The backing layer 12 is to provide the flesh side layer 11 with non-liquid permeability without harming the gas permeability of the flesh layer and is made of a plastic film in an adequate thickness. For the backing layer 12, urethane film or PVC film is preferable and it is laminated onto the flesh side layer 11 by adhesion or other technique.

The surface of the above backing layer 12 is a finely uneven (or embossed) surface and it is provided with numerous holes 14.

The above uneven surface is for making the sticky characteristic of the above backing layer 12 smaller, and numerous fine caves 13 are formed over whole surface of the above backing layer 12, that constitute the finely uneven surface. In this Example, caves about 0.5 mm in diameter and about 0.3 mm deep are formed in a number of about 100 per $cm^2$ making whole surface finely uneven. By making the sticky characteristic of the surface of the backing layer 12 smaller, sliding of the skin member 10 during its cutting was better and sewing machine worked smoother, thus contributing to improving the efficiency of production of skin member by cutting and sewing operations. The number of the caves 13 formed on the above uneven surface may he determined properly depending on the thickness and property of the backing layer, but it is preferable to form at least not less than 50 and/or not more than 150 per $cm^2$.

The holes 14 are for providing skin member 10 for foam molding with gas permeability while keeping liquid non-permeability, and they are formed in a great number over whole surface of the above hacking layer 12. The holes 14 are formed to have diameter of 0.1 to 0.3 mm and provide the skin member 10 for foam molding with proper gas permeability while keeping non-liquid permeability. The number of the holes 14 is preferable to be 20 to 70 per $cm^2$ in view of securing satisfactory gas permeability and making elastic deformation and reversion of the foam molded products better. In this Example, holes 14 are formed in about 20 to 70% (preferably 40 to 60%) of the formed caves.

The skin member 10 for foam molding may be produced by the process shown in FIG. 3.

The fabric 15 that constitutes the flesh side layer 11 and the plastic film 16 that constitutes the backing layer 12 are layered together and passed through between a rubber roller 17 and an embossing roller 18, both of which are contacted under an adequate pressure.

The above embossing roller 18 is heated to a softening temperature of the plastic film 16, depending on the properties of the latter, and over the surface of the roller are provided numerous projections 19 to make the surface of the plastic film 16 finely uneven.

Heating of the above embossing roller 18 is done at a temperature that makes it possible to adhere the above plastic film 16 and the fabric 15, depending on the properties and thickness of layered plastic film and on the time required by the plastic film 16 for passing through the embossing roller 18 while keeping contacting. In this Example the temperature was set at 140 ° C.

The contacting pressure applied onto the above rubber roller 17 and embossing roller 18 is adjusted so as to make the above plastic film 16 adhered to the fabric 15 and at the same time to melt down parts of the plastic film 16 to form holes 14 by said projections 19, during the plastic film 16 is pressed by the projections 19 on the heated embossing roller 18. In this Example it was adjusted to about 6 to 7 kg/cm$^2$. By changing the contacting pressure and rotational speeds of the 2 rollers and also the heating temperature of the embossing roller adequately, the degree of unevenness and size of holes to be formed can be changed as desired.

In this way the above plastic film 16 is softened by the heat of the embossing roller 18 to he adhered onto the fabric 15 during its passing between the embossing roller 18 and the rubber roller 17. At the same time, the surface of the above plastic film 18 is pressed by the above projections 19 to make the surface finely uneven. And in parts of the caves there formed, the projections 19 melt down the plastic film to form holes 14.

A wellknown adhesive may be applied between the fabric 15 and the plastic film 16, if necessary.

The skin member 10 for foam molding, which is obtained in this way is cut into a desired shape and sewn into desired bag or other forms by using an ordinary or ultrasonic sewing machine to make a skin for foam molding.

Now the method of manufacturing foam molded products by using the above skin member 10 for foam molding is explained. As shown in FIG. 4, the skin member 20 in a desired form, that is made by sewing the skin member 10 for foam molding, is placed in the cavity 31 of the foaming mold 30 with the surface layer 11 outside. The numeral 21 shows the seams and the numeral 22 shows an insert that is equipped inside the skin member 20 if desired. This Example shows an embodiment of manufacturing head-rest.

Then urethane ingredient or other liquid foaming material P is poured into the interior of the skin member 20 and is foamed in place integrally with the skin member 20. The holes 14 provided in the backing layer 12 of the skin member 20, in diameter of 0.1 to 0.3 mm as described above, do not allow liquid foaming material P to exudate outside of the skin member 20. Accordingly, there is no chance of its spoiling the outer surface of the skin 20 or causing underfill of foam material due to shortage of the liquid foaming material P. On the other hand, the excess of gases that evolves in the foaming reaction of the foaming material P and the air that is confined within the skin member 20 will escape outside of the skin member 20 from the surface layer 11 through holes 14 formed in the backing layer 12 of the skin member 20, and none will be confined within the skin member 20.

After foaming of the foaming material the desired foam molded product is obtained by removing from the mold. As described before, the foam molded product has sufficient gas permeability through the skin, and so no such a treatment of piercing the plastic film with needles or crushing of the molded product is required. Securing a sufficient gas permeability through the skin member makes elastic deformation and reversion of the foam molded product at use smooth resulting in good cushioning performance and gas permeability.

Because whole of the skin member has gas permeability, the internal part of a round head-rest (the so-called doughnut type head-rest) to which perforation has been difficult to apply previously still holds good gas permeability and is free of unpleasant feeling at use due to stuffiness.

Example 4

A skin member with a gas permeability of 0.13 cm$^3$/cm$^2$/sec, in which the back side of moquette is hacked with a backcoating of acrylic polyester (overall thick pile length: 2.40 to 2.50 mm; thickness of backcoating: 0.2 mm; amount of the backcoating applied: 80±10 g/m$^2$; weight: 473 g/m$^2$) was sewn into the covering form of head-rest for car, and the covering was placed in a foaming mold. A foaming material was poured into the covering for foaming in place and the molded product was removed from the mold. The foaming pressure was 1.3 kg/cm$^2$ (shown in FIG. 7 with a sign ☆).

Example 5

A skin member with a similar composition as the one in Example 4, with a gas permeability of 0.63 cm$^3$/cm$^2$/see, was used for producing head-rest in a similar manner as in Example 1, but by adjusting the amount of the foaming material poured and other factors the foaming pressure was made to be 0.9 kg/cm$^2$ (shown in FIG. 7 with a sign ☆).

Same as Examples 4 and 5, a mixture of TDI/MDI and a polyol components were used, the polyol components are composed of a polyether with an average molecular weight of 5000 and a hydroxyl value of 30, a polymer polyol, an amine type/tin type mixed catalyzer and low activity silicone and water as the foaming material.

In both Examples 4 and 5, the gas evolving from the foaming material during the foaming escaped successively outside of the skin member through the member, but it did not allow exudation of the foaming material that had some degree of viscosity.

The head-rest obtained by removing from the mold did not contain any bubbles or underfill, and without crushing or other after-treatment its surface part retained an adequate gas permeability and softness giving a very pleasant touch.

The gas permeability of the skin member was measured by following Method A for Gas Permeability in JIS L 1096.6.27. A test piece was placed in a Frangil type testing machine and it was adjusted to show a pressure of 124.5 Pa in an inclined manometer and gas permeability was obtained from the estimated pressure and the kind of the air hole employed by using the calculating table attached to the testing machine.

Example 6

Five skin members having gas permeabilities shown respectively by the sign of ○ in FIG. 7 were used to adjust the composition and the amount of the foaming material to make respective foaming pressures, and head-rests for car were produced in a similar manner as in Example 4. In FIG. 7, the sign "A" shows the range specified in the tenth invention while "(x)" and "(y)" show the area within the range claimed by the ninth invention but outside of the range claimed by the tenth invention.

The results show that, because each example showed a gas permeability and/or foaming pressure at or close to the upper or lower limit, bubbles were formed to cause in some cases difficulty in obtaining molded product with desired form, or a tendency of exudation of the foaming material from seams of the covering was observed, but in overall evaluation products with virtually satisfactory form, gas permeability, softness and other properties could be obtained.

It is noted that in the present invention, not being limited by the above concrete Examples, many examples may be presented by varying conditions within the ranges claimed by the present invention, depending on the object and use. For example, the invention may be used for the production of office chairs, seats of tractor and bus and other products with relatively simple forms or such molded products as front and rear seats of car.

The present invention is not limited to the specific examples described above, but may be modified into a variety of examples, depending on the objective and use, within the scope of the present invention.

What is claimed is:

1. An integrally molded polyurethane foam product comprising a skin member formed into the shape of said foam product by sewing and polyurethane foam that is formed by depositing or pouring a liquid foaming material into said skin member and foaming, wherein said skin member is made by laminating a fabric and a synthetic resin film and is provided with 5 to 100 per cm$^2$ of through holes in a diameter of 0.01 to 0.03 mm.

2. An integrally molded polyurethane foam product as claimed in claim 1, wherein said synthetic resin film is polyurethane or polyvinyl chloride, the thickness of said film is 30 to 100 μm, said diameter of said through holes is 0.05 to 0.2 mm and the number of said through holes is 10 to 50 per cm$^2$.

3. An integrally molded polyurethane foam product as claimed in claim 1, wherein said skin member is made by cutting said member into the shape of said foam product, wherein said member is provided at the time of cutting with 5 to 100 per cm$^2$ of through holes in a diameter of 0.01 to 0.03 mm, and by sewing said member to form said foam product.

4. An integrally molded polyurethane foam product as claimed in claim 3, which is produced with a foaming pressure of 0.5 to 2.0 kg/cm$^2$.

5. An integrally molded polyurethane foam product comprising a skin member formed into the shape of said foam product by sewing and polyurethane foam that is formed by depositing or pouring a liquid foaming material into said skin member and foaming, wherein said skin member is made by laminating a fabric and a synthetic resin film, said synthetic resin film having an uneven surface on the back side of the surface laminated with said fabric, and part of or all of caves in said uneven surface are provided with holes having a diameter of 0.1 to 0.3 mm.

6. An integrally molded polyurethane foam product as claimed in claim 5 wherein said diameter of said caves in said uneven surface is 0.4 to 0.6 mm and the number of said caves is 50 to 100 per cm$^2$.

7. An integrally molded polyurethane foam product as claimed in claim 5, wherein said skin member formed into the shape of said foam product by sewing is produced by providing numerous caves and holes having a diameter of 0.1 to 0.3 mm in said synthetic resin film of said skin member, by using an embossing roller whose outer surface is provided with numerous projections and heated, and then cutting and sewing said skin member to form the shape of said foam product.

8. An integrally molded polyurethane foam product comprising a skin member and a polyurethane foam, in which said skin member is composed of a fabric with a backcoating that backs one side surface of said fabric, and the gas permeability of said skin member is 0.01 to 1.0 cm$^3$/cm$^2$/sec and said backcoating and said polyurethane foam are joined directly.

9. An integrally molded polyurethane foam product as claimed in claim 8 wherein the foaming pressure of said polyurethane foaming material is 0.5 to 2.0 kg/cm$^2$.

10. An integrally molded polyurethane foam product as claimed in claim 8, wherein said foaming pressure of said polyurethane foaming material is represented by P kg/cm$^2$ and is within a range shown in the following equation:

$$(G+0.98)\times 50/99 \leq P \leq (G+2.96)\times 50/99$$

wherein G is said gas permeability in cm$^3$/cm$^2$/sec.

* * * * *